United States Patent Office 2,775,587
Patented Dec. 25, 1956

2,775,587

HALOARYL AZIRIDINECARBOXAMIDES

Bryant C. Fischback, Walnut Creek, and Guy H. Harris, Concord, Calif., assignors to The Dow Chemical Company, Midland, Mich., a corporation of Delaware No Drawing. Application May 23, 1955,
Serial No. 510,564

6 Claims. (Cl. 260—239)

The present invention is concerned with novel haloarylaziridine carboxamides of the formula

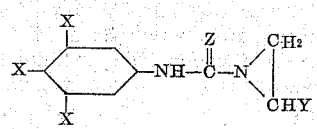

In this and succeeding formulae, one of the X symbols represents chlorine, bromine or iodine and the remaining X symbols each represent hydrogen, methyl, chlorine, bromine or iodine, Z represents oxygen or sulfur and Y represents hydrogen or a lower alkyl radical. The expression lower alkyl is inclusive of alkyl radicals containing from 1 to 4 carbon atoms, inclusive. The new compounds are crystalline solid materials which are somewhat soluble in many organic solvents and of very low solubility in pentane and water.

The compounds are valuable as parasiticides and adapted to be employed as active toxic constituents of disinfectant and germicide compositions for the control of many common bacterial and fungal organisms.

The new compounds may be prepared by mixing or blending aziridine or a 2-lower alkyl aziridine with a haloaryl isocyanate or isothiocyanate of the formula

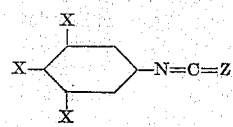

The contacting of the reagents conveniently may be carried out in an inert organic solvent such as diethyl ether, diisopropyl ether, benzene, toluene or an aliphatic hydrocarbon such as pentane. The amount of the aziridine and cyanate reagents to be employed is not critical, some of the desired product being obtained when employing any proportions of the reagents. Optimum yields are obtained when employing substantially equimolecular proportions of the reagents. The reaction is somewhat exothermic and takes place smoothly at temperatures of from −10° to 50° C. The temperature may be controlled by regulating the rate of contacting the reactants and/or by external cooling. During the reaction, the desired product usually precipitates in the reaction mixture as a crystalline solid. When the product does not separate during the course of the reaction, precipitation of the product may be effected by cooling and diluting the reaction mixture with a suitable solvent such as pentane. The precipitated product may be separated by filtration and thereafter purified by washing with pentane or ether and recrystallizing from an organic solvent such as benzene.

In carrying out the reaction, the aziridine or 2-lower alkyl aziridine and cyanate reagent may be contacted portionwise in the inert solvent. This operation is carried out with stirring and at a temperature of from −10° to 50° C. It is preferable to cool the solutions of reactants to about 5° C. before contacting. Following the contacting of the reagents, stirring is continued for a short period of time to complete the reaction. The reaction mixture is then treated as previously described to separate the desired product.

The following examples illustrate the invention but are not to be construed as limiting:

*Example 1.—4'-chloro-1-aziridinethiocarboxanilide*

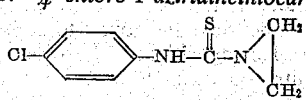

Ten grams (0.232 mole) of aziridine (ethylenimine) was dissolved in 50 milliliters of diethyl ether and the resulting solution added portionwise with stirring and cooling to 42.5 grams (0.250 mole) of 4-chlorophenyl isothiocyanate dispersed in 250 milliliters of diethyl ether. The addition was carried out over a period of 10 minutes and at a temperature of from 20° to 35° C. Following the addition, stirring was continued for 0.5 hour to complete the reaction. During the reaction, a 4'-chloro-1-aziridinethiocarboxanilide product precipitated in the reaction mixture as a crystalline solid. The latter was separated by filtration, washed with diethyl ether and dried. The dried product melted at 108° C. with decomposition and weighed 39.3 grams. The product had nitrogen, sulfur and chlorine contents of 12.57, 14.5 and 16.13 percent, respectively. Theoretical contents correspond to 13.18, 15.08 and 16.68 percent, respectively.

*Example 2.—3'-chloro-1-aziridinecarboxanilide*

35 grams (0.813 mole) of aziridine was dissolved in 100 milliliters of n-pentane and the resulting solution added portionwise with stirring and cooling to 125 grams (0.813 mole) of 3-chlorophenyl isocyanate dispersed in 600 milliliters of n-pentane. The addition was carried out over a period of one-third hour and at a temperature of from 15° to 35° C. Following the addition, stirring was continued for 0.5 hour to complete the reaction. The reaction mixture was then filtered to separate a 3'-chloro-1-aziridinecarboxanilide product as a crystalline residue. The latter was washed with n-pentane and recrystallized from benzene. The recrystallized product weighed 149.5 grams and had a melting point of 93.8°–95.2° C., a nitrogen content of 14.1 percent and a chlorine content of 17.7 percent. Theory requires a nitrogen content of 14.25 percent and a chlorine content of 18.03 percent.

*Example 3.—3',4'-dichloro-1-aziridinecarboxanilide*

10 grams (0.232 mole) of aziridine was dissolved in 50 milliliters of diethyl ether and the resulting solution added rapidly with stirring and cooling to 47 grams (0.25 mole) of 3,4-dichlorophenyl isocyanate dispersed in 250 milliliters of diethyl ether. Prior to the addition, the latter isocyanate solution had been cooled to a temperature of about 5° C. During the addition, the temperature of the reaction mixture rose rapidly to about 35° C. Following the addition, stirring was continued for one-half hour to assure completion of the reaction. During the reaction, a 3',4'-dichloro-1-aziridinecarboxanilide product precipitated in the mixture as a crystalline solid. The latter was separated by filtration, washed with diethyl ether and dried. The ether filtrate was also evaporated to dryness to obtain an additional crop of product. The latter product was thereafter dissolved in acetone and the product thereafter precipitated out of the solution by dilution with an ether-pentane mixture. The two products were then combined and found to melt at 103.5°–104° C. and have nitrogen and chlorine contents of 11.77 and 30.7 percent, respectively.

*Example 4.—4'-bromo-1-aziridinecarboxanilide*

Five grams (0.116 mole) of aziridine was dissolved in 25 milliliters of pentane and the resulting solution added portionwise with stirring and cooling to 24.8 grams (0.125 mole) of 4-bromophenyl isocyanate dispersed in 100 milliliters of pentane. The addition was carried out over a period of five minutes, and at a temperature of from 25° to 35° C. Following the addition, stirring was continued for 0.5 hour to insure completion of the reaction. During the reaction, a 4'-bromo-1-aziridinecarboxanilide product precipitated in the mixture as a crystalline solid. The latter was separated by filtration, washed with pentane, and dried. The dried product was thereafter recrystallized from benzene and found to melt at 138.80°–139.5° C. with decomposition. The dried product had bromine and nitrogen contents of 33.33 and 11.53 percent, respectively.

*Example 5.—4'-chloro-1-aziridinecarboxanilide*

Ten grams (0.232 mole) of aziridine was dissolved in 25 milliliters of diethyl ether and the resulting solution added portionwise with stirring and cooling to 35.7 grams (0.232 mole) of 4-chlorophenyl isocyanate dispersed in 100 milliliters of diethyl ether. The addition was carried out over a period of five minutes and at a temperature of from 25° to 35° C. Following the addition, stirring was continued for 0.5 hour to insure completion of the reaction. During the reaction, a 4'-chloro-1-aziridinecarboxanilide product precipitated in the mixture as a crystalline solid. The latter was separated by filtration, washed with diethyl ether and dried and the dried product found to have a chlorine content of 17.99 percent. The dried product was thereafter recrystallized from benzene and found to melt at 134.8°–135.5° C.

*Example 6.—4'-iodo-2-n-butyl-1-aziridinecarboxanilide*

0.3 mole of 2-n-butyl aziridine is dissolved in 60 milliliters of diethyl ether and the resulting solution added portionwise with stirring and cooling to 0.3 mole of 4-iodophenyl isothiocyanate dispersed in 300 milliliters of diethyl ether. The addition is carried out over a period of 10 minutes and at a temperature of from 15 to 35° C. Following the addition, stirring is continued for one-half hour to complete the reaction. During the reaction, a 4'-iodo-2-n-butyl-1-aziridinethiocarboxanilide product precipitates in the mixture as a crystalline solid and is separated by filtration.

*Example 7.—3'-chloro-4'-methyl-1-aziridinecarboxanilide*

6.5 grams (0.15 mole) of aziridine was dissolved in 50 milliliters of n-pentane and the resulting solution added rapidly with stirring and cooling to 24 grams (0.143 mole) of 3-chloro-4-methylphenyl isocyanate dissolved in 250 milliliters of n-pentane. Prior to the addition, the isocyanate solution had been cooled to about 5° C. Following the addition, stirring was continued for 0.5 hour to complete the reaction. During the reaction, a 3'-chloro-4'-methyl-1-aziridinecarboxanilide product precipitated in the reaction mixture as a crystalline solid. The latter was separated by filtration, washed twice with n-pentane and dried. The dried product melted at 91.2°–92.2° C. and had a nitrogen content of 13.07 percent.

*Example 8*

0.2 mole of 1-methyl aziridine is dissolved in 75 milliliters of n-pentane and the resulting solution added portionwise with stirring and cooling to 0.2 mole of 3,4,5-trichlorophenyl isothiocyanate dispersed in 250 milliliters of n-pentane. The reaction mixture is then stirred for one-half hour and thereafter cooled and filtered. As a result of these operations, there is obtained a 3',4',5'-trichloro-2-methyl-1-aziridinethiocarboxanilide product as a crystalline solid.

In a similar manner, other haloaryl aziridinecarboxamides may be prepared as follows:

3'-iodo-2-n-butyl-1-aziridinethiocarboxanilide by the reaction of 2-n-butyl aziridine with 3-iodophenyl isothiocyanate.

3',4' - dibromo-2-isopropyl-1-aziridinecarboxanilide by the reaction of 2-isopropylaziridine with 3,4-dibromophenyl isocyanate.

3',5'-dichloro-2-methyl-1-aziridinethiocarboxanilide by the reaction of 2-methyl aziridine with 3,5-dichlorophenyl isothiocyanate.

3',4'-diiodo-1-aziridinecarboxanilide by the reaction of aziridine with 3,4'-diiodophenyl isocyanate.

3'-bromo-4'-chloro-1-aziridinecarboxanilide by the reaction of aziridine with 3-bromo-4-chlorophenyl isocyanate.

4'-bromo-2-ethyl-1-aziridinethiocarboxanilide by the reaction of 2-ethyl aziridine with 4-bromophenyl isothiocyanate.

The products of the preceding examples are effective as fungicides for the control of many common fungal organisms such as *Alternaria solani*. In a representative operation, an aqueous dispersion of 4'-chloro-1-aziridinecarboxanilide was employed for the control of the germination of the spores of *Alternaria solani*. In such operation, the degree of control was calculated as the minimum dose in parts by weight of the 4'-chloro-1-aziridinecarboxanilide compound per million parts by weight of the aqueous composition sufficient to bring about a 50 percent inhibition of spore germination. The latter dosage may be referred to as the ED–50 dose. 4'-chloro-1-aziridine carboxanilide had an ED–50 dose of 5 parts per million. In a further operation, poultry feed compositions containing 0.1 percent of this compound were employed for the control of turkey blackhead. In such operations, 100 percent controls of blackhead were obtained.

The haloaryl isothiocyanates as employed in accordance with the teachings of the present invention may be prepared by reacting together equimolecular proportions of a suitable haloaniline or halotoluidine, carbon bisulfide and an alkali metal hydroxide or ammonium hydroxide to produce an alkali metal or ammonium haloaryldithiocarbamate. The latter carbamate compound is then treated in aqueous solution with an excess of lead nitrate and the resulting mixture steam distilled to separate the haloaryl isothiocyanate.

In an alternative method, the haloaryl isothiocyanates are prepared by reacting one molecular proportion of a suitable haloaniline or halotoluidine with one molecular proportion of thiophosgene in an inert solvent. Following the reaction, the haloaryl isothiocyanate compound is separated by vacuum distillation.

The haloaryl isocyanates as employed in the present invention may be prepared by reacting one molecular portion of a suitable molten haloaniline or halotoluidine hydrochloride with one molecular proportion of phosgene. Following the reaction the desired haloaryl isocyanate product is recovered by conventional methods.

We claim:

1. A compound of the formula

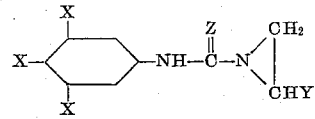

wherein one of the X symbols represents at least one member of the group consisting of bromine, chlorine and iodine, and the remaining X symbols each represent a member of the group consisting of hydrogen, methyl, chlorine, bromine and iodine, Z represents a member of the group consisting of oxygen and sulfur and Y represents a member of the group consisting of hydrogen and the lower alkyl radicals.

2. 4'-chloro-1-aziridine carboxanilide.
3. 4'-bromo-1-aziridinecarboxanilide.
4. 3',4'-dichloro-1-aziridinecarboxanilide.
5. 3'-chloro-1-aziridinecarboxanilide.
6. 4'-chloro-1-aziridinethiocarboxanilide.

References Cited in the file of this patent

UNITED STATES PATENTS 2,312,863     Bestian _____ Mar. 2, 1943

FOREIGN PATENTS 863,343     Germany _____ Jan. 15, 1953